Oct. 9, 1951     A. N. TROSHKIN ET AL     2,570,406
SWIVEL COUPLING
Filed Feb. 8, 1949
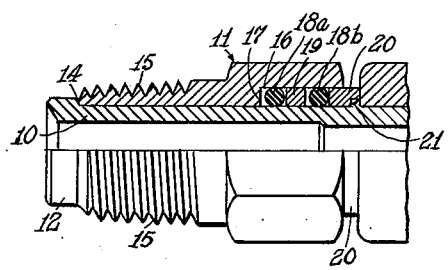
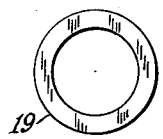 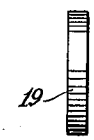 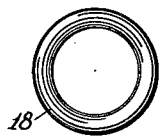 
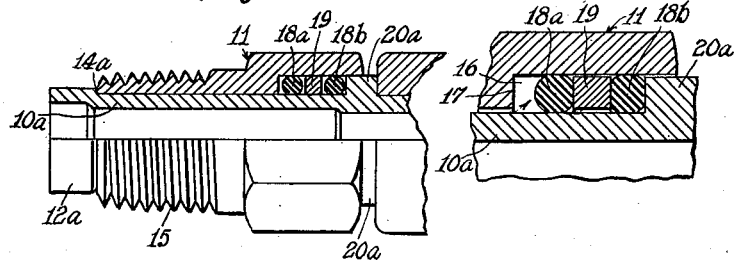
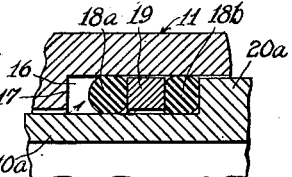
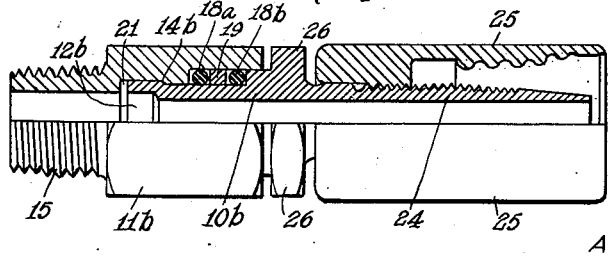
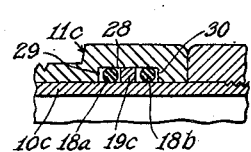
INVENTORS
ALEXANDER N. TROSHKIN
AND IRVING D. PRESS
BY
ATTORNEYS Patented Oct. 9, 1951

2,570,406

UNITED STATES PATENT OFFICE 2,570,406

SWIVEL COUPLING

Alexander N. Troshkin, Nutley, and Irving D. Press, Union, N. J., assignors to Resistoflex Corporation, Belleville, N. J., a corporation of New York Application February 8, 1949, Serial No. 75,204

1 Claim. (Cl. 285—97.9)

This invention relates to swivel couplings, more particularly those adapted for attachment to flexible hose, tubing, pipes or other fluid conduits.

An object of the invention is to provide a coupling for medium and high pressure use which may be attached to the end of a flexible hose, said coupling having a threaded part to be screwed into another member, the threaded part being freely rotatable relative to the part attached to the hose yet adequately sealed against leakage when the hose is subjected either to pressure or vacuum.

Another object is to provide a swivel coupling having a high margin of safety, particularly for use with fluids the escape of which may be dangerous.

Another object of the invention is to provide a swivel coupling which comprises a minimum of parts and is adapted to manufacture with a minimum of machining operations.

A further object is to provide a swivel coupling and sealing means permitting the coupling to be screwed and unscrewed many times without developing leaks.

Other objects and advantages of the invention will appear in the course of the following detailed description of the present preferred embodiment of the invention, taken in conjunction with the drawings in which, Fig. 1 is a half sectional elevation of one form of coupling in accordance with the invention;

Figs. 2 and 3 are respectively front and side elevations of the slidable ring forming part of the sealing means;

Figs. 4 and 5 are respectively front and side elevations of an O-ring, of resilient material, forming part of the sealing means;

Fig. 6 is a half sectional elevation of a modified form of coupling;

Fig. 7 is an enlarged detail showing the sealing means subjected to fluid pressure;

Fig. 8 is a half sectional elevation of a further modification of the coupling; and Fig. 9 is a detailed section through the sealing means of another modification.

Referring to Fig. 1, the coupling comprises a tubular member 10 and a swivel member 11 rotatably mounted thereon. The tubular member 10 has an enlarged end portion 12 providing a shoulder 14 which abuts the front end of the swivel member 11. This type of tubular member may be machined from bar stock. The swivel member 11 is provided with a pipe thread 15 on its front end and its rear end is enlarged and formed with a hexagonal exterior so that it may be gripped and rotated by a wrench. Inside tne rear hexagonal portion, member 11 is provided with an open-ended annular recess 16 having a radially-extending forward face 17. In the recess 16 there are positioned in succession an O-ring 18a, a rigid ring 19 slidable in the recess, and a second O-ring 18b. In Figs. 4 and 5 the O-ring is designated 18. Closing the rear open end of the recess 16 is an annular flange 20 which extends a short distance into the recess 16 and is secured on tubular member 10, after assembly of the parts, by a staking operation which forms a slight projection 21 behind the flange 20, which is grooved to receive the projection.

The O-rings 18a and 18b are of resilient material such as rubber, synthetic rubber or the like and are so proportioned relative to the recess 16 as to be slightly compressed in their radial dimension. The length of the recess is such as to permit a slight axial movement of the O-rings along the outer surface of the tubular member 10. Ring 19 is preferably of rectangular cross-section and is so dimensioned as to have a slight clearance with respect to the walls of the recess 16 so that it may freely slide therein. It may be made of any rigid material such as metal, fibre etc. since its purpose is merely to transmit pressure from one O-ring to another.

Referring to Fig. 6, the coupling there shown is substantially of the same construction as that of Fig. 1 except that in place of the separate flange 20 of Fig. 1, the tubular member 10a is formed with an integral flange 20a and has initially an end portion of the same outer diameter as the internal diameter of the swivel member 11, the end portion which extends beyond the swivel member being expanded after assembly to form the enlarged end portion 12a having a shoulder 14a which keeps the swivel member 11 in place.

The modification shown in Fig. 8 is generally similar to the structure of Fig. 6 except that the enlarged end portion 12b of tubular member 10b is expanded into an internal groove 21 against the shoulder 14b in swivel member 11b. This construction is advantageous if the threaded portion 15 is of small diameter. In this figure the complete coupling is shown including the nipple portion 24 of the tubular member 10b and the cooperating ferrule 25, between which the hose end is gripped in a known manner. Nipple 24 and ferrule 25 may be threaded so as to be screwed together and, to enable the nipple 24 to be rotated relative to the ferrule 25, the tubular member 10b is provided with a wrench-receiving hexagonal portion 26.

Instead of providing the swivel member 11 with a recess which is open at the rear end and closed by means of a flange on the tubular member, the swivel member 11c shown in Fig. 9 may be provided with a wholly internal annular groove 28 having end walls 29 and 30. In this construction the sliding ring 19c would be split to enable its insertion between the O-rings 18a and 18b.

It will be understood that any of the couplings above described may be screwed into a threaded aperture in a member, to or from which it is desired to conduct fluid, it being possible to rotate the swivel members 11, 11b or 11c without twisting the hose or pipe to which the tubular member 10, 10a, 10b or 10c may be connected.

In any of the structures described there is bound to be some leakage of fluid under pressure along the interface between the swivel member and the tubular member up to the point where such fluid encounters the first O-ring 18a. Since this O-ring 18a is compressed slightly between the inner and outer walls of the recess 16 in which it is located, fluid pressure will be built up behind this O-ring 18a causing it to move toward the opposite end of the recess. In so moving, the O-ring 18a will press against the rigid ring 19 or 19c which in turn presses against the O-ring 18b as illustrated in Fig. 7. Since ring 19 or 19c floats freely in the recess, the pressure on O-ring 18b will be substantially equal to that on O-ring 18a. The greater the pressure the greater the sealing effect will be and if both rings are perfect, an equal sealing effect will be exerted by each ring under any given pressure. However, should O-ring 18a be defective or fail and fluid leaks past it, it will be sealed against escape by O-ring 18b. It will be noted that the sealing effect of O-ring 18b will be equal to that of O-ring 18a even though the pressure of the fluid that escapes past the latter ring is relatively very low, because the full fluid pressure exerted upon ring 18a is transmitted by it through the rigid ring 19 or 19c to O-ring 18b.

The sealing means or coupling of the invention provides the maximum of safety and permits the use of higher pressures than has heretofore been possible with swivel couplings with any margin of safety. At the same time, the sealing means presents very little frictional resistance to the turning of the swivel member when the coupling is not subjected to fluid pressure. The invention is not limited to two O-rings with one spacer ring, but a greater number may be used if desired.

The coupling works equally well under either vacuum or pressure, the only difference being that under vacuum atmosperic pressure is exerted on the sealing means from the outside of the swivel member and the O-rings and rigid spacer will move in a direction opposite to that shown in Fig. 7.

Since various changes may be made in the details of construction above described for purposes of illustration, the invention is not to be considered as limited thereto but is to be construed broadly within the purview of the claim.

What is claimed is:

A swivel coupling comprising, in combination, a tubular member having a flange, a swivel member rotatably mounted on said tubular member, said swivel member having an annular internal recess providing an annular space between said swivel and tubular members, at least two resilient O-rings located in said annular space, said O-rings being proportioned relative to said annular space so as to be slightly compressed radially and slidable in an axial direction therein, a rigid ring of rectangular cross-section located between adjacent O-rings and freely slidable axially in said annular space, the axial length of said annular space being substantially greater than the total combined thicknesses of said O-rings and said rigid ring whereby said O-rings and rigid ring may move in an axial direction in said annular space during the functioning of said coupling.

ALEXANDER N. TROSHKIN.
IRVING D. PRESS.

REFERENCES CITED

The following references are of record in the file of this patent:

UNITED STATES PATENTS

| Number | Name | Date |
| --- | --- | --- |
| 359,394 | Jones et al. | Mar. 15, 1887 |
| 871,577 | Dunkel | Nov. 19, 1907 |
| 2,190,419 | Evarts | Feb. 13, 1940 |
| 2,300,584 | Martin | Nov. 3, 1942 |
| 2,450,581 | Couty | Oct. 5, 1948 |

FOREIGN PATENTS

| Number | Country | Date |
| --- | --- | --- |
| 246,554 | Great Britain | Jan. 27, 1926 |